(12) United States Patent
Rubino et al.

(10) Patent No.: US 10,263,240 B2
(45) Date of Patent: Apr. 16, 2019

(54) SANDWICH CATHODE LITHIUM BATTERY WITH HIGH ENERGY DENSITY

(71) Applicant: Greatbatch Ltd., Clarence, NY (US)

(72) Inventors: Robert S. Rubino, Williamsville, NY (US); William C. Thiebolt, Tonawanda, NY (US); Marcus J. Palazzo, Wheatfield, NY (US); Joseph M. Lehnes, Williamsville, NY (US); Ho-Chul Yun, East Amherst, NY (US); Mark J. Roy, Buffalo, NY (US)

(73) Assignee: Greatbatch Ltd., Clarence, NY (US)

( * ) Notice: Subject to any disclaimer, the term of this patent is extended or adjusted under 35 U.S.C. 154(b) by 278 days.

(21) Appl. No.: 15/290,595

(22) Filed: Oct. 11, 2016

(65) Prior Publication Data

US 2017/0104207 A1    Apr. 13, 2017

Related U.S. Application Data

(60) Provisional application No. 62/239,867, filed on Oct. 10, 2015.

(51) Int. Cl.
| | |
|---|---|
| *H01M 4/04* | (2006.01) |
| *H01M 4/131* | (2010.01) |
| *H01M 4/66* | (2006.01) |
| *H01M 4/133* | (2010.01) |
| *H01M 10/0568* | (2010.01) |

(Continued)

(52) U.S. Cl.
CPC ......... *H01M 4/0404* (2013.01); *H01M 4/131* (2013.01); *H01M 4/133* (2013.01); *H01M 4/136* (2013.01); *H01M 4/1391* (2013.01); *H01M 4/1393* (2013.01); *H01M 4/1397* (2013.01); *H01M 4/366* (2013.01); *H01M 4/623* (2013.01); *H01M 4/624* (2013.01); *H01M 4/661* (2013.01); *H01M 10/052* (2013.01);

(Continued)

(58) Field of Classification Search
CPC ............ H01M 4/0404; H01M 4/1391; H01M 4/1393; H01M 4/1397; H01M 4/366; H01M 4/131; H01M 4/133; H01M 4/136; H01M 4/661; H01M 4/623; H01M 4/624; H01M 10/052; H01M 2220/30
See application file for complete search history.

(56) References Cited

U.S. PATENT DOCUMENTS

| | | |
|---|---|---|
| 6,551,747 B1 | 4/2003 | Gan |
| 6,607,861 B2 | 8/2003 | Gan et al. |

(Continued)

*Primary Examiner* — Laura Weiner
(74) *Attorney, Agent, or Firm* — Michael F. Scalise; Steven W. Winn (57) ABSTRACT

A lithium electrochemical cell with increased energy density is described. The electrochemical cell comprises an improved sandwich cathode design with a second cathode active material of a relatively high energy density but of a relatively low rate capability sandwiched between two current collectors and with a first cathode active material having a relatively low energy density but of a relatively high rate capability in contact with the opposite sides of the two current collectors. In addition, a cathode fabrication process is described that increases manufacturing efficiency. The cathode fabrication process comprises a process in which first and second cathode active materials are directly applied to opposite surfaces of a perforated current collector and laminated together. The present cathode design is useful for powering an implantable medical device requiring a high rate discharge application.

30 Claims, 3 Drawing Sheets

(51) Int. Cl.
    *H01M 10/0569*    (2010.01)
    *H01M 4/1391*     (2010.01)
    *H01M 4/1393*     (2010.01)
    *H01M 4/36*       (2006.01)
    *H01M 4/62*       (2006.01)
    *H01M 4/136*      (2010.01)
    *H01M 4/1397*     (2010.01)
    *H01M 10/052*     (2010.01)

(52) U.S. Cl.
    CPC ... *H01M 10/0568* (2013.01); *H01M 10/0569*
        (2013.01); *H01M 2220/30* (2013.01)

(56)             References Cited

U.S. PATENT DOCUMENTS

| | | |
|---|---|---|
| 6,645,670 B2  | 11/2003 | Gan |
| 6,926,991 B2  | 8/2005  | Gan et al. |
| 7,018,743 B2  | 3/2006  | Guidi et al. |
| 7,052,804 B2  | 5/2006  | Rubino et al. |
| 7,056,358 B2  | 6/2006  | Takeuchi et al. |
| 7,479,349 B2  | 1/2009  | O'Phelan et al. |
| 7,531,274 B1  | 5/2009  | Roy et al. |
| 7,776,470 B2  | 8/2010  | Gan et al. |
| 7,855,009 B2  | 12/2010 | Rubino et al. |
| 8,133,614 B1  | 3/2012  | Lehnes et al. |
| 8,153,293 B2  | 4/2012  | Rubino et al. |
| 8,241,788 B1  | 8/2012  | Shah et al. |
| 8,871,379 B2  | 10/2014 | Gan |
| 9,077,030 B2  | 7/2015  | Norton et al. |
| 9,231,256 B2  | 1/2016  | Shah et al. |
| 2006/0035147 A1 | 2/2006 | Lam et al. |

SANDWICH CATHODE LITHIUM BATTERY WITH HIGH ENERGY DENSITY

CROSS-REFERENCE TO RELATED APPLICATION

This application claims priority from U.S. Provisional Patent Application Ser. No. 62/239,867, filed Oct. 10, 2015.

TECHNICAL FIELD

This invention relates to the conversion of chemical energy to electrical energy. In particular, the present invention relates to a new sandwich cathode design having a second cathode active material of a relatively high energy density but of a relatively low rate capability sandwiched between two current collectors, and with a first cathode active material having a relatively low energy density but of a relatively high rate capability in contact with the opposite sides of the current collectors. The present cathode design is useful for powering an implantable medical device requiring a high rate discharge application.

BACKGROUND OF THE INVENTION

Electrochemical cells provide electrical energy that powers a host of electronic devices such as external and implantable medical devices. Among these many medical devices powered by electrochemical cells are external medical drills and implantable cardiac defibrillators. Such medical devices generally require the delivery of a significant amount of current in a relatively short duration of time. Thus, these devices typically require the use of electrochemical cells that comprise an increased delivery capacity and an increased rate of charge delivery. As defined herein, "delivery capacity" is the maximum amount of electrical current that can be drawn from a cell under a specific set of conditions. The terms, "rate of charge delivery" and "rate capability" are defined herein as the maximum continuous or pulsed output current a battery can provide per unit of time. Thus, an increased rate of charge delivery occurs when a cell discharges an increased amount of current per unit of time.

Cathode chemistries such as carbon monofluoride ($CF_x$) have been developed to provide increased discharge capacities that meet the power demands of external and implantable medical devices. $CF_x$ cathode material is generally known to have a discharge capacity of about 875 mAh/g, which is well suited for powering implantable medical devices over long periods of time. However, electrochemical cells constructed with cathodes comprised of carbon monofluoride are generally considered to exhibit a relatively "low" rate capability. For example, electrochemical cells constructed with lithium anodes and $CF_x$ cathodes typically exhibit rate capabilities from about 0.5 mA/cm$^2$ to about 3 mA/cm$^2$. As such, electrochemical cells constructed with Li/$CF_x$ couples are generally well suited for powering electrical devices, like an implantable cardiac pacemaker that require power over long periods of time at a relatively low discharge rate.

In contrast, electrochemical cells constructed with lithium anodes and cathodes comprising silver vanadium oxide (SVO) are generally considered to exhibit a relatively "high" rate capability. Lithium cells constructed with SVO cathodes, in contrast to $CF_x$ cathodes, generally exhibit rate capabilities that range from about 25 mA/cm$^2$ to about 35 mA/cm$^2$. As such, lithium electrochemical cells constructed with cathodes comprised of SVO are generally well suited to power devices that require an increased rate capability, such as an implantable cardiac defibrillator. However, lithium cells constructed with cathodes comprising SVO typically have a lower discharge capacity as compared to those having cathodes comprising $CF_x$. Silver vanadium oxide cathode material is generally known to have a discharge capacity of about 315 mAh/g, which is significantly less than the discharge capacity of 875 mAh/g for $CF_x$ as previously discussed. Therefore, what is desired is an electrochemical cell having an electrode design that comprises both a relatively "high" discharge capacity material and a relatively "high" rate capability material that is capable of providing increased discharge capacity at a relatively high rate.

Prior art electrochemical cells comprising a lithium anode and a cathode constructed with both $CF_x$ and SVO materials are disclosed in U.S. Pat. No. 6,551,747 to Gan, which is assigned to the assignee of the present application and incorporated herein by reference. These cells are well suited for powering implantable medical devices, such as implantable defibrillators, that require a relatively high charge capacity with an increased discharge rate. The present invention provides a lithium electrochemical cell comprising a sandwich electrode design that incorporates both relatively high discharge capacity and relatively high rate capability materials similar to that described by the Gan '747 patent, but having an increased energy density and improved rate capability in comparison to prior art cells.

In addition, the present invention provides for an efficient assembly process that is more conducive for manufacturing. Prior art electrochemical cells, such as those disclosed in the Gan '747 patent, are assembled using a number of time consuming manual process steps. The assembly process of the present invention provides for a more efficient process that eliminates many of the time consuming manual steps of the prior art assembly process, thereby reducing manufacturing time and expense.

SUMMARY OF THE INVENTION

As is well known by those skilled in the art, an implantable cardiac defibrillator is a device that requires a power source for a generally medium rate, constant resistance load component provided by circuits performing such functions as, for example, the heart sensing and pacing functions. From time-to-time, the cardiac defibrillator may require a generally high rate, pulse discharge load component that occurs, for example, during charging of a capacitor in the defibrillator for the purpose of delivering an electrical shock to the heart to treat tachyarrhythmia, the irregular, rapid heartbeats that can be fatal if left uncorrected.

Accordingly, the object of the present invention is to improve the performance of lithium electrochemical cells by providing an improved electrode design. Further objects of this invention include providing a cell design for improving energy density by increasing electrical capacity and improving rate capability.

To fulfill these needs, an improved sandwich cathode design having an increased energy density that exhibits increased discharge capacity within a lithium electrochemical cell is provided. The cathode design of the present invention comprises a first cathode active material of a relatively high energy density but of a relatively low rate capability, for example $CF_x$, sandwiched between two current collectors and with a second cathode active material having a relatively low energy density but of a relatively high rate capability, for example SVO, in contact with the opposite sides of the current collectors. Such an exemplary cathode design may comprise SVO/current collector/$CF_x$/current collector/SVO.

In addition to the improved cathode design, an improved method of manufacture is provided. Unlike prior art electrode manufacturing processes, the assembly process of the present invention eliminates many inefficient manual manufacturing process steps, thereby decreasing manufacturing time and cost.

These and other objects of the present invention will become increasingly more apparent to those skilled in the art by reference to the following description and to the appended drawings.

DETAILED DESCRIPTION OF THE PREFERRED EMBODIMENTS

As used herein, the term "pulse" means a short burst of electrical current of a significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10 second pulses (40 mA/cm$^2$) with a 15 second rest between each pulse.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the other electrode of the cell. The cathode is preferably of solid materials and the electrochemical reaction at the cathode involves conversion of ions that migrate from the anode to the cathode into atomic or molecular forms. The solid cathode may comprise a first active material of a metal element, a metal oxide and a mixed metal oxide, and combinations thereof, and a second active material of a carbonaceous chemistry. The metal oxide and the mixed metal oxide of the first active material has a relatively lower energy density but a relatively higher rate capability than the second active material.

The first active material is formed by the chemical addition, reaction, or otherwise intimate contact of various metal oxides and/or metal elements, preferably during thermal treatment, sol-gel formation, chemical vapor deposition or hydrothermal synthesis in mixed states. The active materials thereby produced contain metals and oxides of Groups IB, IIB, IIIB, IVB, VB, VIB, VIIB and VIII, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$, where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary, cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference. Another preferred composite transition metal oxide cathode material includes $V_2O_z$ wherein z≤5 combined with $Ag_2O$ with silver in either the silver(II), silver(I) or silver(0) oxidation state.

It is further contemplated that the first active material of the present sandwich cathode design is any material which has a relatively lower energy density but a relatively higher rate capability than the second active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the first active material.

The sandwich cathode design of the present invention further includes a second active material of a relatively high energy density and a relatively low rate capability in comparison to the first cathode active material. The second active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely. In addition to fluorinated carbon, $Ag_2O$, $Ag_2O_2$, $CuF_2$, $Ag_2CrO_4$, $MnO_2$ and even SVO itself are useful as the second active material.

Before fabrication into a sandwich electrode for incorporation into an electrochemical cell according to the present invention, the first and second cathode active materials, prepared as described above, are preferably mixed with a binder material and a solvent to create respective first and second cathode material slurries. Binders such as, but not limited to a powdered fluoro-polymer, more preferably powdered polytetrafluoroethylene or powdered polyvinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) may be mixed with the respective first and second cathode active materials, i.e., SVO and $CF_x$, to formulate the first and second cathode slurries. In addition, up to about 10 weight percent of a conductive diluent may be added to the cathode slurries to improve conductivity. Suitable materials for this purpose include acetylene black, carbon black and/or graphite or a metallic powder such as powdered nickel, aluminum, titanium and stainless steel.

In an embodiment, the first slurry may comprise a binder of polyvinylidene fluoride (PVDF), a solvent of n-methyl-2-pyrrolidone (NMP), carbon black and the SVO cathode active material. The second slurry may comprise a binder of polyvinylidene fluoride, a solvent of dimethylformamide (DMF), carbon black and the $CF_x$ cathode active material. The applicants have discovered that proper selection of binder and solvent is beneficial in achieving adhesion of the respective first and second cathode active materials to the opposed surfaces of the cathode current collector, particularly a cathode current collector composed of aluminum.

Figure 1:
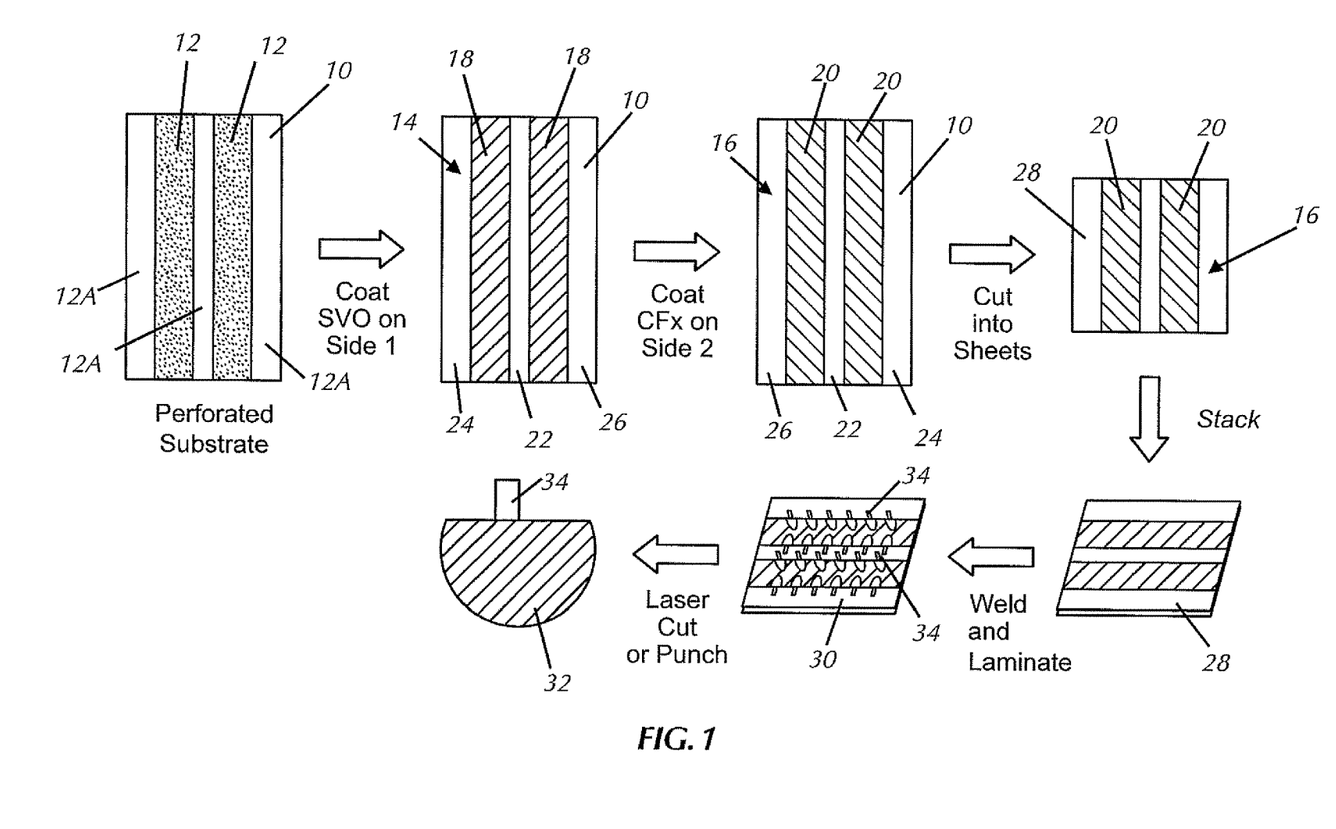
FIG. 1 illustrates an embodiment of the cathode assembly process of the present invention.

FIG. 1 illustrates an overview of an embodiment of the cathode assembly process of the present invention. In the embodiment, each of the first and second cathode active materials, SVO and $CF_x$, is applied directly to an opposing surface of a perforated substrate 10 which serves as the cathode current collector. The substrate 10 is preferably composed of a metal selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys. The preferred substrate material for the cathode current collector is aluminum. In an embodiment, the perforated substrate 10 may be in a continuous sheet form, such as a reel or roll.

As illustrated in FIG. 1, the substrate 10 that forms the cathode current collector is preferably perforated in selected areas thereof. In a preferred embodiment, the substrate 10 comprises a plurality of perforations 12 that extend through the thickness of the substrate 10 between opposing first and second substrate surfaces 14, 16. Other areas 12A of the current collector 10 are preferably unperforated. In an embodiment, the perforations may be of a plurality of different cross-sectional geometries. Examples of perforated shapes may include, but are not limited to, a circle, an oval, a rectangle, a star, or a triangle. In an embodiment, the perforation pattern may be formed by a photoetch process or by mechanically pressing or punching the substrate 10 prior to application of the cathode slurries. The plurality of perforations 12 that extend through the thickness of the cathode current collector enable the exchange of ions between the first and second cathode active materials, i.e., SVO and $CF_x$, as both the first and second slurries comprising the SVO and $CF_x$ cathode active materials, are preferably applied directly to the perforated surface of the current collector. In a preferred embodiment, the plurality of perforations 12 create a cathode current collector having a percent open area that ranges from about 20 percent to about 30 percent, more preferably from about 21 percent to about 25 percent. As defined herein, the percent open area is calculated within a 3 $mm^2$ region of the perforated area of the current collector. This preferred range of open area provides a balance between an open area that is large enough for the exchange of ions between the first and second cathode active materials while ensuring an open area that is small enough for adhesion of the first and second slurries to the surface of the cathode current collector. Additionally the range of open area is tailored to provide for a mechanically robust current collector.

In an embodiment, a first layer 18 of the first cathode slurry comprising SVO is applied to the first surface 14 of the substrate 10 at the perforations 12. A second layer 20 of the second cathode slurry comprising $CF_x$ is applied to the second, opposite surface 16 of the perforated current collector. Alternatively, the first and second slurries may be simultaneously applied to the respective first and second perforated current collector surfaces 14, 16. In either case, the cathode assembly process of the present invention provides for a process in which the first and second slurries may be continuously applied to a roll or reel-to-reel of perforated cathode current collector.

In a preferred embodiment, the first and second slurries may be applied to the current collector by coating, spreading, or screen printing the respective slurries directly to the perforated surface 14, 16 of the substrate 10. For example, a doctor blade may be used to apply a coating of the slurry to the perforated current collector surface. In an embodiment, the first cathode slurry comprising SVO is applied to the first perforated surface 14 of the current collector at a weight basis that ranges from about 10 mg/$cm^2$ to about 30 mg/$cm^2$, preferably from about 10 mg/$cm^2$ to about 20 mg/cm2, most preferably about 15 mg/$cm^2$, per layer of the first cathode slurry. The second cathode slurry comprising $CF_x$ is applied to the second perforated surface 16 of the current collector at a weight basis that ranges from about 10 mg/$cm^2$ to about 40 mg/$cm^2$, preferably from about 15 mg/$cm^2$ to about 30 mg/cm2, most preferably about 21 mg/$cm^2$, per layer of the second slurry.

In a preferred embodiment, as shown in FIG. 1, each of the first and second layers 18, 20 of the cathode active materials may comprise respective left and right cathode active material strips that are separated by an intermediate gap 22 that is preferably unperforated and that extends lengthwise along the substrate surfaces 14, 16. In addition, left and right margins 24, 26 that are preferably unperforated separate the first and second layers 18, 20 of the cathode active material from the side edges of the substrate 10. The intermediate gap 22 and left and right margins 24, 26 are bare surfaces of the substrate of the cathode current collector on which the cathode active materials are not present. In a preferred embodiment, the intermediate gap 22 may have a width that spans from about 1 cm to about 5 cm between the left and right strips of cathode active materials 18, 20 on both sides 14, 16 of the current collector. The left and right margins 24, 26 may have a width that spans from about 1 cm to about 5 cm between the substrate side edge and the respective left and right strips of cathode active material.

In contrast, prior art cathode current collectors are fabricated from individual sheets of titanium on which the cathode active materials are pressed at pressures upwards of 30 tons per square inch onto a photoetched perforated pattern. The prior art photoetching process is a cumbersome time consuming process that comprises masking and exposing individual sheets of titanium to a chemical etch bath. Then, a carbon coating is applied to the surface of the titanium current collector prior to the cathode active material being pressed thereon. This carbon coating process is used to inhibit corrosion of the titanium current collector by the formation of TiF from direct exposure to $CF_x$. In contrast, the assembly process of the present application comprises direct application of the cathode active slurries to the surface of a continuous reel or roll of aluminum current collector that has been previously perforated, either by a photoetching or a mechanical stamping process. The cathode assembly process therefore eliminates the carbon coating process of the prior art. In addition, the cathode assembly process of the present invention eliminates the time consuming process of masking and photoetching individual titanium sheets of the prior art process. Thus, the cathode assembly process of the present application provides for a more efficient and cost effective manufacturing process.

After the first and second active slurries are applied to their respective opposing first and second cathode current collector surfaces 14, 16, the slurries are dried at a temperature that ranges from about 100° C. to about 130° C. Alternatively, the first active slurry may be dried prior to the application of the second active slurry. Once dried, the first side of the cathode current collector preferably comprises a fluoro-polymer binder at about 4 weight percent, a conductive diluent at about 3 weight percent and about 93 weight percent of the first cathode active material, SVO. The second side of the current collector preferably comprises a fluoro-polymer binder at about 3 weight percent, a conductive diluent at about 3 weight percent and about 94 weight percent of the second cathode active material, $CF_x$.

Once the first and second active slurries are dry, the coated current collectors are cut into separate sheets 28, which are then stacked. In an embodiment, two coated sheets 28 are stacked back to back so that the layers of the $CF_x$ material are positioned in contact with each other. Alternatively, one sheet 28 may be folded lengthwise along the gap 22 so that the layers of CFx material that reside opposite the gap 22, are facing each other and are in physical contact. The folded or stacked sheets 28 are then welded together at least along one of the left and right margins 24, 26 to create a cathode sheet assembly 30. Subsequently, the welded cathode sheet assembly 30 is roll pressed in a direction perpendicular to the coating direction to laminate the sheet assembly 30 together. The preferred roll press direction helps prevent curling or warping of the assembly 30. In an embodiment, the roll press is heated to a temperate that ranges between about 50° C. to about 100° C. In a preferred embodiment, the dried first slurry that comprises the first active material is pressed to a density that ranges from about 1.2 g/cc to about 1.6 g/cc and the dried second slurry that comprises the second active material is pressed to a density that ranges from about 2.8 g/cc to about 3.6 g/cc. Individual cathodes 32 are then removed from the assembly 30, such as by laser cutting or punching the cathodes in a desired shape. Such shapes may include, but are not limited to, a rectangle, an oval or polygon that fits within the electrochemical cell casing (not shown). The cathode 32 preferably comprises an integrated cathode tab 34 that is formed from the gap 22 of the metallic substrate. In an embodiment, the cathode is constructed to thereby comprise the following sequence:

SVO/current collector/$CF_x$/current collector/SVO

Figures 2, 3, 4:
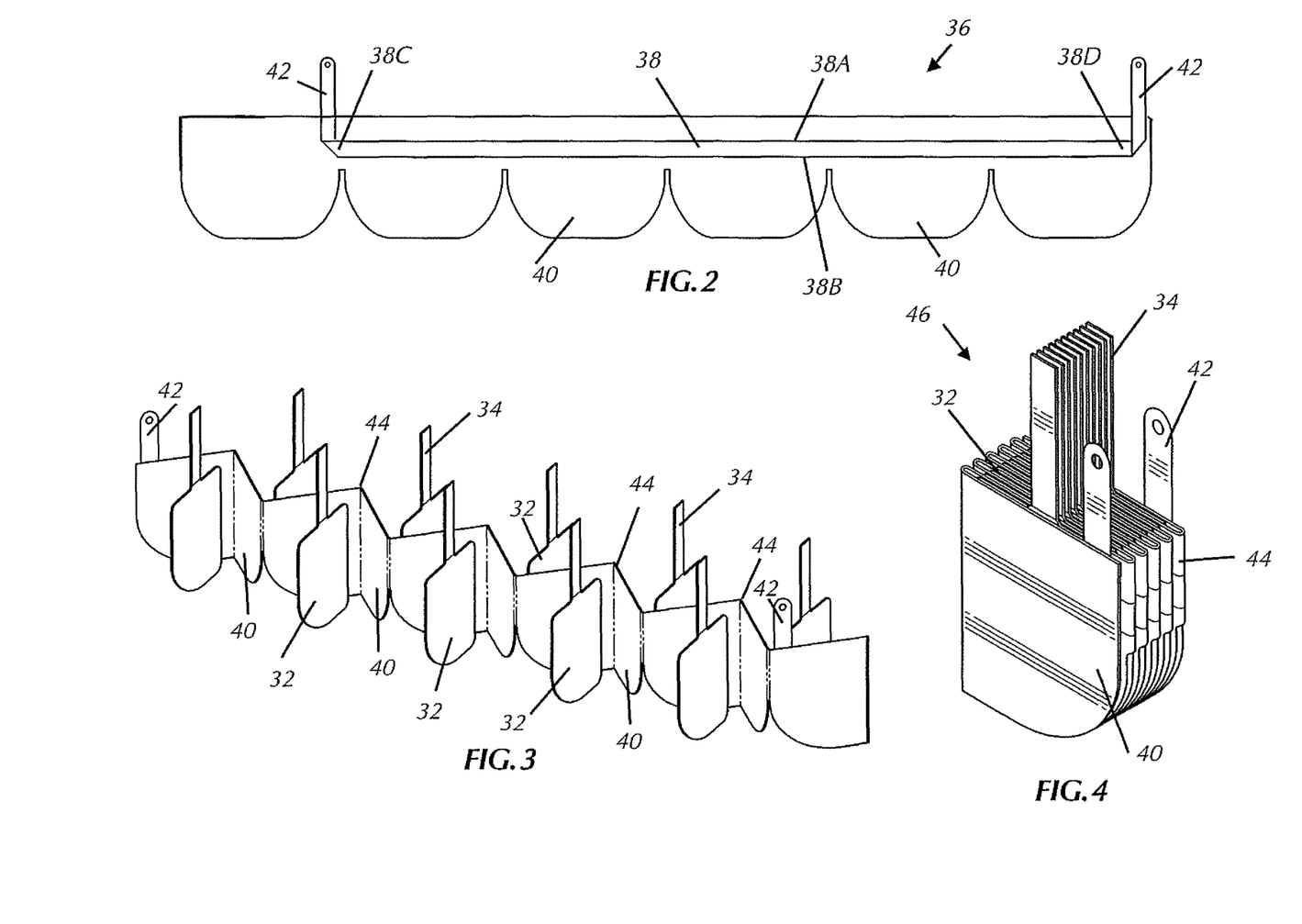
FIG. 2 shows an embodiment of the anode assembly.
FIG. 3 is an explode view of an embodiment of an electrode assembly of the present invention.
FIG. 4 illustrates a perspective view of an embodiment of an assembled electrode assembly shown in FIG. 3.

FIG. 2 illustrates an embodiment of an anode assembly 36 of the present invention. As shown, the anode 36 is constructed such that an anode current collector 38, comprising a strip of metal, preferably nickel, having an upper edge 38A spaced from a lower edge 38B, both edges extending to opposed end portions 38C, 38D is positioned in direct contact with the anode active material, such as lithium. As shown in the embodiment, the anode active material comprises a plurality of anode leaves 40 having a scalloped shaped. However, it is contemplated that the form of the leaves 40 of anode active material may be of an unlimited shape. Examples of which may include, but are not limited to, a rectangle, an oval, or a multi-sided polygon shape. In a preferred embodiment, the leaves 40 of the anode active material are formed and shaped to fit within the casing of the electrochemical cell. Once the anode current collector 38 has been pressed to the anode active material, anode current collector tabs 42 are formed by bending the ends of the anode current collector 38. As illustrated in FIG. 3, the anode assembly, including the current collector strips 38, is then folded in an accordion fashion between adjacent anode leaves 40. This allows for individual cathodes 32 to be placed therebetween. As shown, individual cathodes 32 are positioned between folds 44 of the anode active material 40 and current collector strips 38 to form an electrode assembly 46, an embodiment of which is illustrated in FIG. 4.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator material preferably includes polypropylene. Other separator materials may include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methylpyrrolidinone (NMP), and mixtures thereof. In the present invention, the preferred anode is lithium metal and the preferred electrolyte is 0.8M to 1.5M $LiAsF_6$ or $LiPF_6$ dissolved in a 30:70 mixture, by volume, of propylene carbonate as the preferred high permittivity solvent and 1,2-dimethoxyethane as the preferred low viscosity solvent.

An important aspect of the present invention is that both the high rate cathode material (in this case the SVO material) and the high capacity material, $CF_x$ are positioned in direct contact with the current collector. The cathode current collector is preferably composed of aluminum. This preferred current collector composition minimizes any potential undesirable reaction that may occur between the cathode active material and the current collector. Prior art electrochemical constructions, such as those disclosed in U.S. Pat. No. 6,551,747, to Gan et al., utilize a layer of carbon to inhibit possible corrosion between the $CF_x$ and the surface of a titanium current collector. This carbon layer is not ideal as it may impede ion transfer between the SVO and $CF_x$ materials. In addition, the carbon occupies space which could otherwise be used for active electrode materials.

Another embodiment of the present invention is that the cell construction has been optimized to remove electrochemically non-active material. For example, the thickness of the cathode current collector is reduced by about 57 percent to provide additional volume for electrochemical active materials, such as $CF_x$. For example, the thickness of the cathode current collector is reduced from about 0.07 mm to about 0.03 mm.

Another important aspect of the present invention is that a greater ratio of high capacity material having the low rate capability is preferably positioned between two layers of high rate cathode material (either high or low capacities). Since the $CF_x$ material has significantly higher volumetric capacity than that of SVO material, i.e., approximately 1.77 times greater, in order to optimize the final cell capacity, the amount of $CF_x$ material should be maximized and the amount of SVO material used in each electrode should be minimized to the point that the volume of SVO is still practical in engineering and acceptable in electrochemical performance. In an embodiment, the preferred volume ratio of $CF_x$ to SVO ranges from about 2 to about 12. The increased volume of $CF_x$ significantly increases cell capacity. Thus, by optimizing the design of the cell, for example, by removing non-active materials, such as decreasing the thickness of the current collector and removing the carbon from between the $CF_x$ material and the current collector surface, through the use of an aluminum current collector, additional volume within the cell is gained which is now occupied by active electrode materials.

The following examples describe the manner and process of an electrochemical cell according to the present invention, and they set forth the best mode contemplated by the inventors of carrying out the invention, but they are not to be construed as limiting.

Example

Three lithium electrochemical test cells, each having a volume of about 6.2 cc were constructed comprising the cathode assembly of the present invention. Each of the three test cells were constructed having a cathode comprising a first cathode active layer having a 15.5 mg/cm$^2$ weight basis of a $Ag_2V_4O_{11}$ (SVO) mix containing 93% SVO, 4% of a PVDF binder and 3% of a carbonaceous diluent, by weight, applied directly to a first surface of an aluminum cathode current collector. The other side of the current collector had a 23.3 mg/cm$^2$ weight basis of a $CF_x$ mix containing 94% active $CF_x$, 3% of a PVDF binder and 3% of a carbonaceous diluent applied directly to the cathode current collector surface. The cathode was constructed having a total thickness of 0.49 mm with each of the CFx layers comprising 0.17 mm of the cathode thickness, each layer of SVO comprising 0.05 mm and each current collector comprising a thickness of 0.03 mm.

The test cells according to the present invention were assembled with the SVO side of cathode facing a lithium anode and two layers of polypropylene separator disposed between the cathode and the anode. Each cell was activated with an electrolyte of 1.2M $LiAsF_6$/PC:DME=30:70. The theoretical capacity of this cell was calculated to be 1914 mAh at a 2 V background voltage cutoff.

The test cells according to the present invention were then pulse discharged under a 3.23 A pulsing current (40 mA/cm$^2$). The pulse trains consisted of four 10 second pulses with a 15 second rest between pulses. The pulse trains were applied to the cell every seven days. The pulse discharge test results for the present invention test cells were then compared to a prior art lithium electrochemical control cell modeled at a volume of 6.2 cc.

The prior art lithium electrochemical cell comprised a cathode having a 28.1 mg/cm$^2$ weight basis of a $Ag_2V_4O_{11}$ (SVO) cathode mix consisting of 94% active SVO, 3% of a PTFE binder and 3% of a carbonaceous diluent, by weight. The other side of the current collector had a 15.7 mg/cm$^2$ weight basis of a $CF_x$ mix containing 91% active $CF_x$, 5% of a PTFE binder and 4% of a carbonaceous diluent. The cathode of the prior art control cell was assembled per the prior art process of manually stacking an SVO blank in a press fixture, followed by a perforated carbon coated titanium current collector, then a CFx blank followed by another perforated carbon coated titanium current collector and then finally a second SVO blank. This stack assembly is subjected to a pressure of about 32 tons/in. The modeled cathode of the prior art cell had a total thickness of about 0.54 mm with the CFx blank comprising 0.22 mm of the total thickness and each SVO blank comprising 0.09 mm of the thickness and the current collector comprising about 0.14 mm of the total thickness. The prior art control cell was activated with an electrolyte of 1.0M $LiAsF_6$/PC:DME=1:1.

The theoretical capacity of the cell was calculated to be 1610 mAh at a 2.0V background voltage cutoff.

The prior art control cell was discharged in the same manner as the test cells of the present invention. The prior art control cell was pulse discharged under a 3.23 A pulsing current (40 mA/cm$^2$). The pulse trains consisted of four 10 second pulses with a 15 second rest between pulses. The pulse trains were applied to the control cell every seven days.

Figure 5:
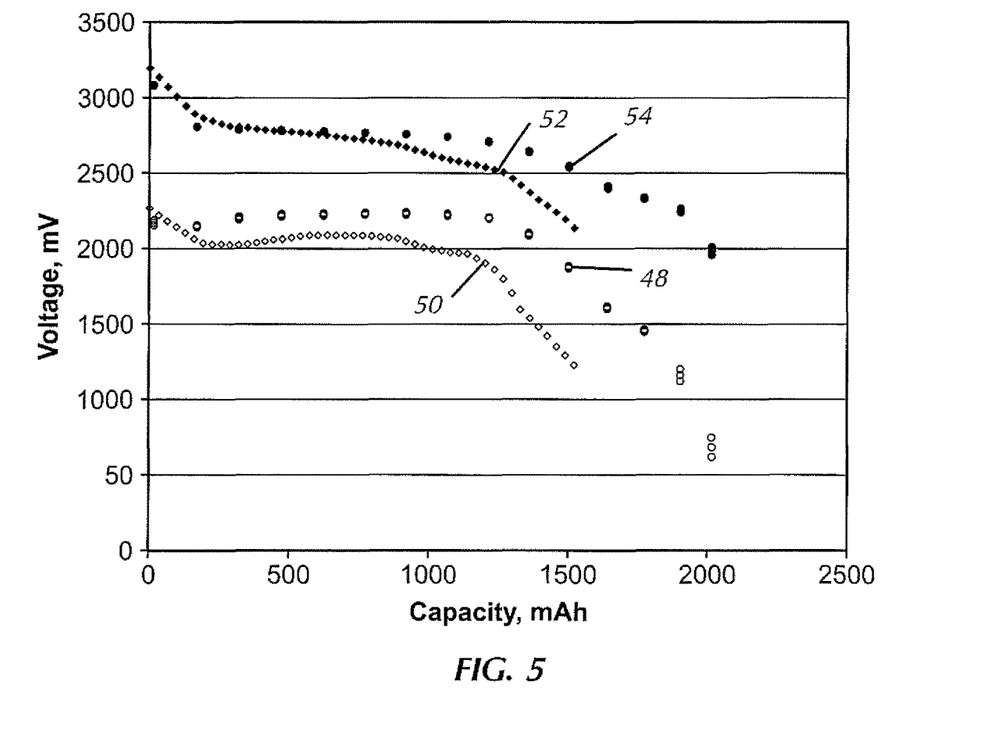
FIG. 5 is a graph that shows discharge capacity vs voltage pulse testing results for test lithium electrochemical cells comprising a cathode constructed according to the present invention in comparison to control lithium electrochemical cells comprising a cathode constructed according to the prior art.

The test results are summarized in FIG. 5, which correlates cell discharge capacity (mAh) to cell voltage (mV) for the average of the three test cells according to the present invention in comparison to the prior art control cell. As illustrated in the graph, the test cells, in general, exhibited an average capacity greater than the modeled control cell. As shown, the average discharge capacity at the pulse 4 minimum potential of the test cells (curve 50) showed a greater average discharge capacity in comparison to the capacity of the pulse 4 minimum potential of the modeled control cell (curve 48). For example, at a 21 minimum voltage of about 1,500 mV, the modeled cell exhibited a discharge capacity of about 1,300 mAh.

In comparison, at a P1 minimum voltage of about 1,500 mV, the test cells exhibited an average discharge capacity of about 1,750 mAh, which is an increase of about 34.6 percent over the modeled control cell. In addition, at a pre-pulse voltage of about 2,500 mV, the modeled cell exhibited a discharge capacity of about 1,300 mAh (curve 52). In comparison, at a pre-pulse voltage of about 2,500 mV, the test cells exhibited an average capacity of about 1,500 mAh (curve 54), which is an increase of about 15.4 percent over the modeled control cell. Furthermore, as illustrated in the graph of FIG. 5, the test cells exhibited a greater end of life discharge capacity of about 2,000 mAh in comparison to the modeled end-of-life discharge capacity of about 1,500 mAh for the same cell volume. The test cells delivered 0.65 Wh/cc (650 Wh/L) to 2.55 V whereas the modeled cell delivered about 0.5 Wh/cc (500 Wh/L) to 2.55V. Accordingly, this example clearly demonstrates the improvement of using a SVO/CF$_x$ sandwich cathode in a high rate, lithium electrochemical cell according to the present invention.

The above discussion discloses an improved sandwich electrode design in a lithium electrochemical cell capable of delivering increased discharge capacity. With the sandwich design of the present invention, the high volumetric capacity CF$_x$ active material is quantitatively converted into or used as high power energy of the SVO material. It is believed that during high energy pulsing, all the discharge energy is provided by the SVO material. Above the discharge voltage of the CF$_x$ electrode material, only SVO electrode material is discharged with the SVO material providing all of the discharge energy for pulsing as well as for any background load discharging. Under these discharge conditions, the CF$_x$ active material is polarized with respect to the SVO material discharge voltages. Then, when the lithium cells having the sandwich cathodes of the present invention are discharged to the working voltage of the CF$_x$ material, both the SVO and CF$_x$ active materials provide the energy for background load discharging. However, only the SVO material provides energy for high rate pulse discharging. After the SVO active material is pulse discharged, the potential of SVO material tends to drop due to the loss of capacity. When the SVO background voltage drops below the working voltage of the CF$_x$ material, the SVO material is believed to be charged by the CF$_x$ material to bring the discharge voltage of the sandwich cathode materials to an equal value. Therefore, it is believed that the SVO material acts as a rechargeable electrode while at the same time the CF$_x$ material acts as a charger or energy reservoir. As a result, both active materials reach end of service life at the same time.

It is appreciated that various modifications to the inventive concepts described herein may be apparent to those of ordinary skill in the art without departing from the spirit and scope of the present invention as defined by the appended claims.

What is claimed is:

1. A method for making a cathode, comprising the following steps:
    a) providing a first current collector having a thickness between first and second major surfaces;
    b) mixing a first electroactive material selected from the group consisting of CF$_x$, Ag$_2$O, Ag$_2$O$_2$, Ag$_2$CrO$_4$, MnO$_2$, SVO, and mixtures thereof with a first binder and a first solvent to create a first slurry;
    c) mixing a second electroactive material different than the first electroactive material and selected from the group consisting of SVO, CSVO, V$_2$O$_5$, MnO$_2$, LiCoO$_2$, LiNiO$_2$, LiMnO$_2$, TiS, FeS, FeS$_2$, and mixtures thereof with a second binder and a second solvent to create a second slurry;
    d) applying spaced apart first and second strips of the first slurry to the first major surface of the first current collector, wherein the first and second strips are separated from each other by a first intermediate gap that is devoid of the first slurry, and wherein there are first and second margins extending from the respective first and second strips to opposed lateral edges of the first current collector opposite the first intermediate gap;
    e) drying the first slurry on the first current collector;
    f) applying spaced apart third and fourth strips of the second slurry to the second major surface of the first current collector, wherein the third and fourth strips are separated from each other by a second intermediate gap that is devoid of the second slurry, and wherein there are third and fourth margins extending from the respective third and fourth strips to the opposed lateral edges of the second current collector opposite the second intermediate gap;
    g) drying the second slurry on the first current collector;
    h) cutting at least one second current collector from the first current collector;
    i) stacking the first current collector on top of the second current collector so that the first electroactive materials of the respective current collectors contact each other opposite outwardly facing second electroactive material supported on the second major surfaces of the respective first and second current collectors;
    j) laminating the first and second current collectors together, thereby forming a current collector stack assembly; and
    k) forming an electrode of a desired shape from the current collector stack assembly with material of the intermediate gaps of the respective first and second current collectors serving as a terminal lead.

2. The method of claim 1, including selecting the first current collector from the group consisting of stainless steel, titanium, tantalum, platinum, gold, aluminum, cobalt, molybdenum, nickel, and nickel alloys.

3. The method of claim 1, including after stacking the first current collector on top of the second current collector with the first and second margins of the first current collector being aligned with the first and second margins of the second current collector, welding the current collectors together at at least one of their aligned margins.

4. The method of claim 1, including providing a plurality of perforations extending through the thickness of the first current collector where the first and second strips of the first slurry contact the first major surface aligned with the third and fourth strips of the second slurry contacting the second major surface thereof.

5. The method of claim 4, including providing the first current collector with a percent open area that ranges from about 20 percent to about 30 percent where the plurality of perforations reside.

6. The method of claim 1, including selecting the first and second binders from polytetrafluoroethylene or polyvinylidene fluoride.

7. The method of claim 1, including selecting the first and second solvents from the group consisting of tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, cyclic carbonates, cyclic esters, cyclic amides, propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

8. The method of claim 1, including using a laser or a punch to form the electrode of the desired shape from the current collector stack assembly.

9. The method of claim 1, including providing the first current collector in a continuous sheet form.

10. The method of claim 1, including providing the first and second intermediate gaps, and the first, second, third and fourth margins being unperforated.

11. The method of claim 1, including drying the first and second slurries at a temperature that ranges from about 100° C. to about 130° C.

12. The method of claim 1, including providing:
a) the first slurry comprising about 3 weight percent of a fluoro-polymer binder, about 3 weight percent of a conductive diluent, and about 94 weight percent $CF_x$; and
b) the second slurry comprising about 4 weight percent of a fluoro-polymer binder, about 3 weight percent of a conductive diluent, and about 93 weight percent SVO.

13. The method of claim 1, including pressing the first and second current collectors together by rolling them in a direction that is substantially perpendicular to a coating direction used to apply the respective first and second slurries to the first current collector.

14. The method of claim 13, including roll pressing the first and second current collectors together at a temperature that ranges from about 50° C. to about 100° C.

15. The method of claim 13, including pressing $CF_x$ as the first electroactive material to a density ranging from about 2.8 g/cc to about 3.6 g/cc, and pressing SVO as the second electroactive material to a density ranging from about 1.2 g/cc to about 1.6 g/cc.

16. A method for making a cathode, comprising the following steps:
a) mixing a first electroactive material selected from the group consisting of $CF_x$, $Ag_2O$, $Ag_2O_2$, $Ag_2CrO_4$, $MnO_2$, SVO, and mixtures thereof with a first binder and a first solvent to create a first slurry, and mixing a second electroactive material different than the first electroactive material and selected from the group consisting of SVO, CSVO, $V_2O_5$, $MnO_2$, $LiCoO_2$, $LiNiO_2$, $LiMnO_2$, TiS, FeS, $FeS_2$, and mixtures thereof with a second binder and a second solvent to create a second slurry;
b) providing a first current collector having a thickness extending to first and second major surfaces, and providing a second current collector having a thickness extending to third and fourth major surfaces;
c) applying spaced apart first and second strips of the first slurry to the first major surface of the first current collector, wherein the first and second strips are separated from each other by a first intermediate gap that is devoid of the first slurry, and wherein there are first and second margins extending from the respective first and second strips to opposed lateral edges of the first current collector opposite the first intermediate gap, and drying the first slurry on the first current collector;
d) applying spaced apart third and fourth strips of the second slurry to the second major surface of the first current collector, wherein the third and fourth strips are separated from each other by a second intermediate gap that is devoid of the second slurry, and wherein there are third and fourth margins extending from the respective third and fourth strips to the opposed lateral edges of the first current collector opposite the second intermediate gap, and drying the second slurry on the first current collector;
e) applying spaced apart fifth and sixth strips of the first slurry to the third major surface of the second current collector, wherein the fifth and sixth strips are separated from each other by a third intermediate gap that is devoid of the first slurry, and wherein there are fifth and sixth margins extending from the respective fifth and sixth strips to opposed lateral edges of the second current collector opposite the third intermediate gap, and drying the first slurry on the second current collector;
f) applying spaced apart seventh and eighth strips of the second slurry to the fourth major surface of the second current collector, wherein the seventh and eighth strips are separated from each other by a fourth intermediate gap that is devoid of the second slurry, and wherein there are seventh and eighth margins extending from the respective seventh and eighth strips to the opposed lateral edges of the second current collector opposite the fourth intermediate gap, and drying the second slurry on the second current collector;
g) stacking the first current collector on top of the second current collector so that the first electroactive material supported on the respective first and third major surfaces contact each other opposite outwardly facing second electroactive material supported on the second and fourth major surfaces of the respective first and second current collectors, wherein the intermediate gaps of the respective current collectors are aligned with each other;
h) laminating the first and second current collectors together, thereby forming a current collector stack assembly; and
i) forming an electrode of a desired shape from the current collector stack assembly with material of the intermediate gaps of the respective first and second current collectors serving as a terminal lead.

17. The method of claim 16, including selecting the first and second current collectors from the group consisting of stainless steel, titanium, tantalum, platinum, gold, aluminum, cobalt, molybdenum, nickel, and nickel alloys.

18. The method of claim 16, including after stacking the first current collector on top of the second current collector with the first and second margins of the first current collector being aligned with the fifth and sixth margins of the second current collector, welding the current collectors together at at least one of their aligned margins.

19. The method of claim 16, including providing a first plurality of perforations extending through the thickness of the first current collector where the first and second strips of the first slurry contact the first major surface aligned with the third and fourth strips of the second slurry contacting the second major surface thereof, and providing a second plurality of perforations extending through the thickness of the second current collector where the fifth and sixth strips of the first slurry contact the third major surface aligned with the seventh and eighth strips of the second slurry contacting the fourth major surface thereof.

20. The method of claim 19, including providing the first and second current collectors with respective percent open areas ranging from about 20% to about 30% where they have the respective first and second plurality of perforations.

21. The method of claim 16, including selecting the first and second binders from polytetrafluoroethylene or polyvinylidene fluoride.

22. The method of claim 16, including selecting the first and second solvents from the group consisting of tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, cyclic carbonates, cyclic esters, cyclic amides, propylene carbonate (PC), ethylene carbonate (EC), butylene carbonate, acetonitrile, dimethyl sulfoxide, dimethyl formamide (DMF), dimethyl acetamide, γ-valerolactone, γ-butyrolactone (GBL), N-methyl-pyrrolidinone (NMP), and mixtures thereof.

23. The method of claim 16, including using a laser or a punch to form the electrode of the desired shape from the current collector stack assembly.

24. The method of claim 16, including providing the first and second current collectors in a continuous sheet form.

25. The method of claim 16, including providing the first, second, third and fourth intermediate gaps and the first, second, third, fourth, fifth, sixth, seventh and eight margins being unperforated.

26. The method of claim 16, including drying the first and second slurries at a temperature that ranges from about 100° C. to about 130° C.

27. The method of claim 16, including providing:
a) the first slurry comprising about 3 weight percent of a fluoro-polymer binder, about 3 weight percent of a conductive diluent, and about 94 weight percent $CF_x$; and
b) the second slurry comprising about 4 weight percent of a fluoro-polymer binder, about 3 weight percent of a conductive diluent, and about 93 weight percent SVO.

28. The method of claim 16, including pressing the first and second current collectors together by rolling them in a direction that is substantially perpendicular to a coating direction used to apply the respective first and second slurries.

29. The method of claim 16, including roll pressing the first and second current collectors together at a temperature that ranges from about 50° C. to about 100° C.

30. The method of claim 16, including pressing $CF_x$ as the first electroactive material to a density ranging from about 2.8 g/cc to about 3.6 g/cc, and pressing SVO as the second electroactive material to a density ranging from about 1.2 g/cc to about 1.6 g/cc.

* * * * *